United States Patent
Sistach et al.

(10) Patent No.: US 12,269,094 B2
(45) Date of Patent: Apr. 8, 2025

(54) METHOD FOR MANUFACTURING TURBOMACHINE PARTS BY MIM MOLDING

(71) Applicant: SAFRAN AIRCRAFT ENGINES, Paris (FR)

(72) Inventors: Hugo Sistach, Moissy-Cramayel (FR); Cédric Pierre Jacques Colas, Moissy-Cramayel (FR); Terence Grall, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 440 days.

(21) Appl. No.: 17/616,927

(22) PCT Filed: Jun. 7, 2020

(86) PCT No.: PCT/FR2020/050966
§ 371 (c)(1),
(2) Date: Dec. 6, 2021

(87) PCT Pub. No.: WO2020/245551
PCT Pub. Date: Dec. 10, 2020

(65) Prior Publication Data
US 2022/0314317 A1   Oct. 6, 2022

(30) Foreign Application Priority Data
Jun. 7, 2019  (FR) ...................................... 1906075

(51) Int. Cl.
*B22F 3/22*   (2006.01)
*B22F 3/10*   (2006.01)
(Continued)

(52) U.S. Cl.
CPC ............ *B22F 3/225* (2013.01); *B22F 3/1021* (2013.01); *B22F 5/04* (2013.01); *B22F 7/062* (2013.01);
(Continued)

(58) Field of Classification Search
CPC .. B22F 3/225; B22F 5/04; B22F 7/062; B22F 2007/066; F01F 9/04; F01F 9/041; F01F 9/042
See application file for complete search history.

(56) References Cited

U.S. PATENT DOCUMENTS 6,033,788 A * 3/2000 Cawley ................... B22F 7/062
                                                  428/548
9,145,782 B2   9/2015 Benard et al.
(Continued)

FOREIGN PATENT DOCUMENTS

CN   101342593 A   1/2009
CN   102413969 A   4/2012
(Continued)

OTHER PUBLICATIONS

English translation of Written Opinion mailed Oct. 7, 2020, issued in corresponding International Application No. PCT/FR2020/050966, filed Jun. 7, 2020, 6 pages.
(Continued)

*Primary Examiner* — Ricardo D Morales
(74) *Attorney, Agent, or Firm* — CHRISTENSEN O'CONNOR JOHNSON KINDNESS PLLC

(57) ABSTRACT

A method for manufacturing an aeronautical part utilizes injection molding. After injecting the prepared mixtures to obtain two green blanks, an assembly area of at least one of these two blanks is heated. The blanks are assembled and then debinding is carried out. A sintering treatment is then carried out.

10 Claims, 2 Drawing Sheets

(51) Int. Cl.
  *B22F 5/04* (2006.01)
  *B22F 7/06* (2006.01)
  *B33Y 10/00* (2015.01)
  *B33Y 30/00* (2015.01)
  *B33Y 80/00* (2015.01)
  *F01D 9/04* (2006.01)

(52) U.S. Cl.
  CPC ........ *F01D 9/042* (2013.01); *B22F 2007/066* (2013.01); *B33Y 10/00* (2014.12); *B33Y 30/00* (2014.12); *B33Y 80/00* (2014.12); *F05D 2230/21* (2013.01); *F05D 2230/22* (2013.01)

(56) References Cited

U.S. PATENT DOCUMENTS

| 10,967,430 B2 | 4/2021 | Fribourg et al. | |
|---|---|---|---|
| 2007/0102572 A1* | 5/2007 | Bohdal | B22F 3/225 244/62 |
| 2008/0199343 A1 | 8/2008 | Rust et al. | |
| 2013/0051987 A1 | 2/2013 | Durocher et al. | |
| 2013/0052074 A1 | 2/2013 | Durocher et al. | |
| 2016/0221081 A1* | 8/2016 | Yoshizawa | B22F 7/062 |
| 2016/0263656 A1 | 9/2016 | Scalzo et al. | |

FOREIGN PATENT DOCUMENTS

| CN | 104704217 A | 6/2015 |
|---|---|---|
| CN | 106891010 A | 6/2017 |
| CN | 107002178 A | 8/2017 |
| CN | 108311701 A | 7/2018 |
| DE | 10 2011 082 484 A1 | 3/2013 |
| DE | 10 2012 206 087 A1 | 10/2013 |
| EP | 2 233 232 A1 | 9/2010 |
| WO | 2010/121966 A1 | 10/2010 |
| WO | 2017/006053 A1 | 1/2017 |
| WO | 2018/220213 A1 | 12/2018 |

OTHER PUBLICATIONS

International Preliminary Report on Patentability mailed Dec. 7, 2021, issued in corresponding International Application No. PCT/FR2020/050966, filed Jun. 7, 2020, 7 pages.

ECAM; "The different stages of the PIM process"; located at https://www.ecam.fr/materiaux-structures/ressources-scientifiques-techniques/le-pim/generalites-procede-pim/; printed on Dec. 6, 2021; pp. 1-7.

International Search Report mailed Oct. 7, 2020, issued in corresponding International Application No. PCT/FR2020/050966, filed Jun. 7, 2020, 6 pages.

Written Opinion mailed Oct. 7, 2020, issued in corresponding International Application No. PCT/FR2020/050966, filed Jun. 7, 2020, 6 pages.

First Chinese Office Action mailed Nov. 9, 2023, issued in corresponding Chinese Patent Application No. 202080052263.0, filed Jun. 7, 2020, 13 pages.

* cited by examiner

METHOD FOR MANUFACTURING TURBOMACHINE PARTS BY MIM MOLDING

FIELD OF THE DISCLOSURE

The disclosure relates to a method for manufacturing an aircraft or turbomachine part for an aircraft by injection molding.

BACKGROUND

PIM corresponds to such molding. This is Powder Injection Molding, as, for example, disclosed in WO2017006053 which can be applied to the present case. Other details are given on the site: https://www.ecam.fr/materiaux-structures/ressources-scientifiques-techniques/le-pim/generalites-procede-pim/.

As in the present case, the method for this is to use plastic binder and powder mixed in a feedstock. This mixed material is then injected to shape the part. Then the piece is debonded—known in French language as "deliantee"—(the plastic binder is removed), sintered and the desired piece is obtained.

This process is effective for injectable parts (which can be done in one go in a mold, then come out of the mold). Some parts, such as compressor rectifiers or turbine nozzles for aircraft turbomachines, are complex parts to inject and remove from the mold. To do so, they would require a complex mold with many drawers, or they would not be directly moldable.

By contrast, other areas of such parts, such as the aforementioned nozzle or rectifier blades, and other vanes, are suitable parts for MIM and inject well.

The above applies in particular to metal parts obtained by the MIM (Metal Injection Molding) technique where the powder is metallic: MIM thus consists of making more or less complex metal components by injecting a mixture of metal powder and a polymer resin (hereafter the "plastic binder", which may be thermoplastic), commonly referred to as "Feedstock". This mixture is reduced to a granular form and then injected.

One of the problems posed here is therefore linked to the manufacture in PIM, and in particular and notably in MIM, of poorly injectable parts.

Another problem is linked to a manufacturing process that must be precise, fast, and that must lead to parts with good mechanical characteristics and temperature resistance, given that the parts to be manufactured may be structural parts such as (sectors of) compressor rectifiers or (sectors of) turbine nozzles.

One solution of the disclosure is to achieve green assembling of part elements by local fusion of binder at their interface.

For example, for a turbine nozzle sector, a proposed solution is to inject the green parts to be assembled, such as, firstly, vanes, and secondly, outer ring (or flange) and inner ring (or flange) sectors, each in ring sectors, and then, after heating(s), to assemble the interface areas between the respective flanges and blades, still in the green state.

Once the binder at the interface has cooled, a complete green nozzle sector is obtained. This can then follow the standard PIM/MIM process (debinding—in French language: "déliantage"—and sintering on a suitable substrate) to produce the desired metal part.

SUMMARY

Both more precisely and more generically, a method for manufacturing an aircraft or turbomachinery part for an aircraft, via injection molding of at least a first green element and a second green element of the part, is hereby proposed, wherein:

a) a mixture of powder and a liquid or molten polymeric binder is prepared for each of the first and second elements, adapted to enable the powder grains to be bonded together, b) the prepared mixtures are injected into molds adapted to the shape of the first and second elements respectively, so as to obtain two green blanks of the first and second elements respectively, c) once the binder has become consistent, the two green blanks are removed from the respective molds, d) at least one assembly area of at least one of the two green blanks, which must be located at the interface between the two green blanks to be assembled together, is heated, so that molten binder is included at the assembly area, e) the two green blanks are assembled together through the at least one assembly area, so as to obtain an overall green blank of the part, f) at least part of the binder is removed from the overall green blank, so as to obtain a debonded overall green blank, and g) a sintering treatment is carried out on the debonded overall green blank.

In this way, it will be possible to manufacture complex parts that cannot be injected using current techniques, whilst using the PIM technique for its performance.

Indeed, powder injection molding is typically an injection molding of parts from a mixture of metal or ceramic powder and polymeric binder, followed by a debinding (elimination of the binder) of the part in a furnace under controlled atmosphere, then by its consolidation by sintering, a priori in another furnace. If the material used is metal, it is called metal injection molding (MIM). This technique has the advantage of being able to create complex shapes with an excellent surface finish and fine tolerances. More cost-effective for complex shapes, powder injection molding allows the production of medium and large series of high-performance parts: Thanks to this technique and powder technology, it is possible to create extremely homogeneous alloys, which have very good corrosion resistance, amongst other qualities.

A corollary problem to step d) preparation of the assembly is the heating context, which is difficult to conduct.

It is therefore proposed that, during step d), the assembly area at least one of the green blanks to be assembled together is heated:

by supplying an additional amount of binder at the location of the assembly area, and/or by supplying heat energy to at least one of the two green blanks at the assembly area until the molten binder is present.

The accessibility of the areas in question, the shapes to be made, the thicknesses in question, etc., can thus be taken into account.

In the case of an additional quantity of binder, this intervention and the assembling step of step e) may favorably include:

before applying the additional amount of binder, melting the additional amount of binder, applying the additional amount of molten binder at the location of the assembly area, and then carrying out the assembling step of step e).

The accessibility of the areas in question, the shapes to be made, the thicknesses in question, etc., can thus be taken into account.

Furthermore, and again preferably, such application of an additional amount of molten binder at the assembly area will comprise an application of the additional amount of molten binder at the location of the assembly area to both green blanks.

In this way, we will have two melts, in shared quantities and with thermal gradients that are a priori better controlled on both parts.

It should also be noted that a well-conducted assembly preparation step d) will at least facilitate and secure the following assembly step e), which can thus be carried out more easily:

by pressing the two green blanks against each other at the location of the assembly area, then, by pressing the two green blanks towards each other.

The better the assembly preparation step d) is carried out, the better the conditions for applying the blanks against each other and the pressure(s) to be applied.

In this respect, it is also favorably proposed:

that in step d), at least the assembly area of at least one of the two green blanks to be assembled together may be heated until molten binder between 75° C. and 85° C. at +/−5° C. is present, and/or, that the at least one assembly area of at least one of the two green blanks to be assembled together is heated to between 2s and 15s.

The implementation of all or part of the above intervention precautions must allow that at the location of the assembly area of at least one of the two green blanks, the or each green blank may present an extra thickness of material (favorable to a strong assembly and to good thermal deployment and solid interlocking between the materials) which will, however, disappear at least in part at the location of the interface, at the end of the step e).

The extra thickness (L hereafter) of material will preferably extend in the direction where the assembling pressure is exerted, thus promoting mechanical strength.

In view of the above, another aspect of the disclosure is related to the specific case of manufacturing a turbomachine compressor rectifier sector or a turbomachine turbine nozzle sector, as the part to be manufactured.

In this case, the two green blanks, respectively of the first and second elements, being then green blanks respectively:

of at least one part of the rectifying vane of the rectifier sector or nozzle sector, and of a sector of an outer ring or a sector of an inner ring of the rectifier sector or nozzle sector, with which one end of the at least one part of the rectifying vane is to be assembled in step e).

The definition of the heating parameters of the plastic binder to be applied and/or the green interface area between the elements must be such that the binder is sufficiently pasty, so that the interfaces bond well, but strong enough for the geometry to be maintained.

In particular on the rectifier or nozzle sectors, a so-called extra thickness of material, potentially necessary during assembly, preferably between 0.5 mm and 2 mm at the interface, or even a pressure applied between the blanks, one towards the other, between 6 and 15 MPa, must favor a final part dimension that is well respected and that the part is not crushed. The precision of the assembly is indeed important and must influence the final dimensions.

DETAILED DESCRIPTION

Figure 1:
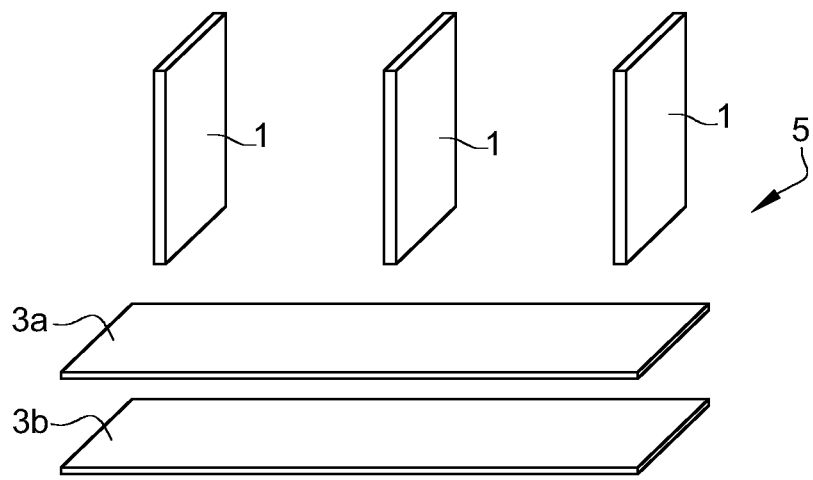
FIG. 1 represents a diagram of elements useful in this example for making a part in accordance with the disclosure, in an initial state.
Figure 6:
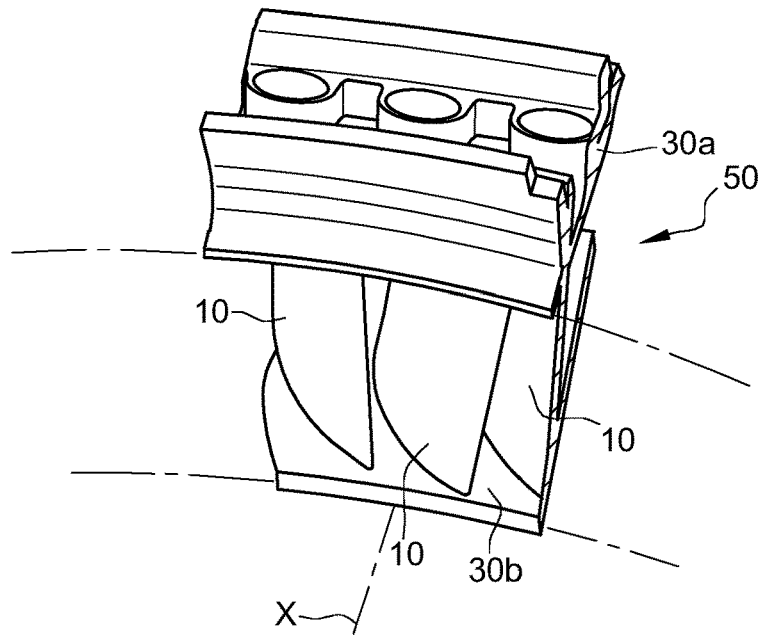
FIG. 6 shows a perspective drawing of an example of an aircraft turbomachinery rectifier or nozzle sector that can be manufactured according to the disclosure.

The aim here is to manufacture an aircraft or turbomachine part for an aircraft, such as that marked 50 in FIG. 6, by injection molding (PIM, such as MIM) of at least a first and a second green element, such as elements 1 and 3*a* or 1 and 3*b* in FIG. 1, constituting the part.

Between FIGS. 1-5 and FIG. 6, the elements and parts correspond to each other: in FIG. 6, a zero has been added to them on the right; thus, part 5 of FIGS. 1-5 corresponds to part 50 of FIG. 6; similarly, the elements 1,3*a*,3*b* of FIGS. 1-5 and those respectively 10,30*a*,30*b* of part 50 of FIG. 6.

As shown in FIG. 6, the elements and the symbolic part 1,3*a*,3*b* and 5 of FIGS. 1-5 may therefore correspond respectively to parts 10,30*a*,30*b* of a compressor rectifier sector 50 of an aeronautical turbomachine or a turbine nozzle sector of such a turbomachine. In aeronautical turbomachines, the compressor and turbine modules comprise impellers alternating with rectifiers, in the case of compressors, or with nozzles, in the case of turbines. A commonly used compressor rectifier comprises a plurality of rectifying vanes attached, for example by welding, to an outer ring which has a structural function and which delimits the airflow path on the outer side. On the inner side, the airflow path is bounded by a non-structural inner shroud. The outer ring, the vanes and the inner ring are typically made of metal. A conventional turbine nozzle is commonly formed from several metal sectors obtained in a single piece by foundry and each comprising an outer shell sector defining the gas flow path on the outer side, an inner shroud sector defining the gas flow path on the inner side and vanes connecting the outer and inner shroud sectors.

It should be noted that the expressions "inner" and "outer" are to be considered radially with respect to the longitudinal axis X (see FIG. 6) of the turbomachine around which the rotor part, and in particular the aforementioned impellers, rotates.

Thus, in FIG. 6, a sector 50 of a rectifier or nozzle has been schematized.

The sector 50 comprises an outer flange or ring segment 3*a*, locally defining an outer platform, and an inner flange or ring segment 3*b*, locally defining an inner platform, between which extend vanes 10 for directing the airflow in a direction favorable to driving, for example, an axially adjacent impeller (not shown). The vanes 10 are substantially radial to the X axis.

Circumferentially, around the axis X, several such sectors 50 are assembled together to form a nozzle; see dotted line FIG. 6.

Once assembled, the segments 3a form the outer annular platform of the rectifier or nozzle, and the segments 3b form the inner annular platform.

The disclosure makes it possible to manufacture such sectors with complex shapes.

The proposed procedure is as follows, which is presented with reference to the generic diagrams in FIGS. 1-5, in the case of MIM type molding:

a) a mixture of metal powder and a liquid or molten polymeric binder, adapted to enable the powder grains to be bonded together, is first prepared to make each of the first and second elements 3a,3b.

Thus, a binder is defined here as a constituent or set of constituents that bind the metal powder grains together to form a mixture of homogeneous appearance.

The binder may include additives intended, for example, to facilitate dispersion, suspension of the metal powders or to improve other characteristics of the mixture.

The term "liquid" for the binder includes the molten state and corresponds to various consistencies which may be characterized by their viscosity.

The binder is chosen to be able to take on a consistency when desired. By this is meant a state configured to retain a shape as opposed to, for example, the liquid state. Typically, a homogeneous mixture of a liquid or molten binder and a Ni, Co or Fe based superalloy could be prepared (as a non-limiting example).

An injection composition as in FR3028784 could also be used.

Once step a) has been carried out and a mixture of powder and binder has been obtained, the process will follow by:

b) injecting the prepared mixtures into molds adapted respectively to the shape of the first element, such as an element 1, and of the second element, such as an element 3a or 3b, so as to obtain two green blanks, respectively of the first and second elements.

Such a manufacturing technique of PIM type (MIM if the powder is metallic) is well known and mastered. Then:

c) once the binder has become consistent, the two green blanks are removed from the respective molds.

Figure 2:
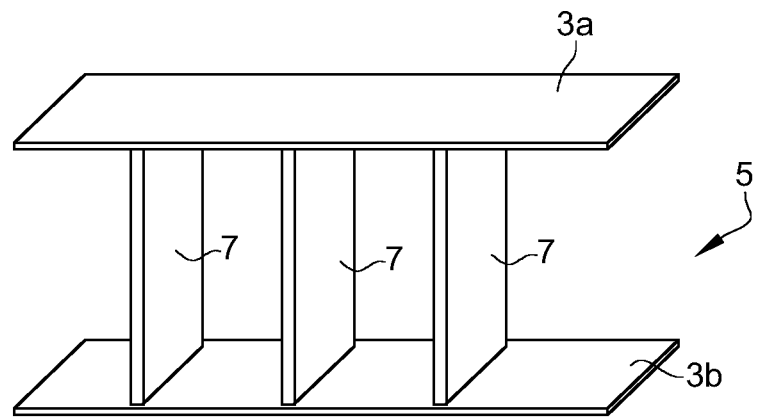
FIG. 2 represents a diagram of the elements of FIG. 1, in a subsequent state of making the part in accordance with the disclosure.

If necessary, it is specified that a green part (or element) is its injected state, extracted from the mold, unlike a brown part (or element), once it has been debonded; see step f). It will then be possible, if necessary, to pre-position at least some of the molded elements. This is illustrated in FIG. 2: a tooling with supports 7 has been interposed between the elements 3a and 3b. These supports 7 are erected where the series of elements 1 to be present between the elements 3a and 3b are to be positioned, as are the vanes 10 between the outer ring segments or sectors 3a and 3b of the inner ring.

The tooling with supports 7 is used to hold the elements 1 during the following steps d) and e).

In step d), the assembly to be carried out in step e) is prepared.

Figure 3:
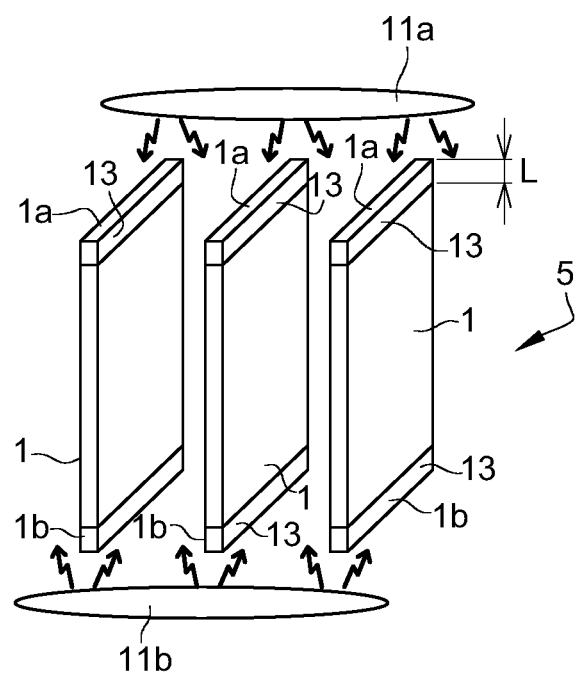
FIG. 3 represents a diagram of the elements of FIG. 2, in a subsequent state of making the part in accordance with the disclosure.
Figure 4:
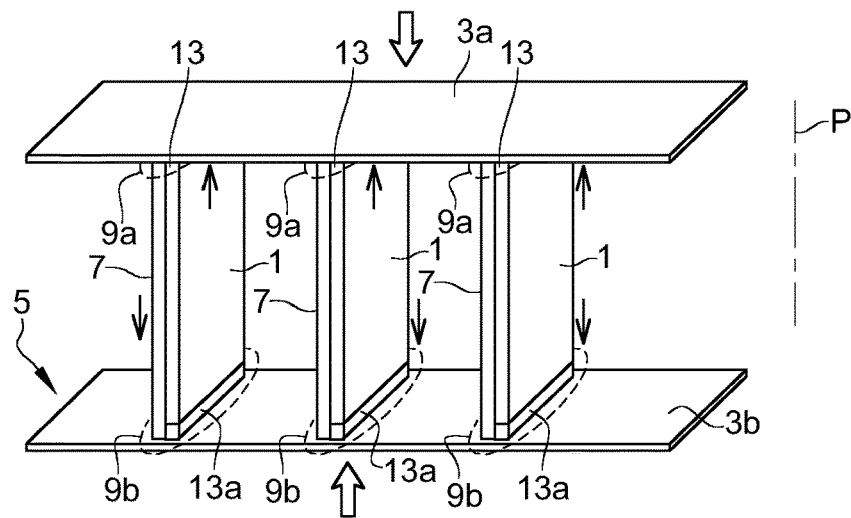
FIG. 4 represents a diagram of the elements of FIG. 3, in a subsequent state of making the part in accordance with the disclosure.

Therefore, step d) ensures that at least one assembly area, such as areas 1a and/or 1b in FIG. 3, to be located at the interface between the two green blanks to be assembled together, of at least one of the two green blanks 1,3a and/or 1,3b, is heated; see areas 9a, 9b in FIG. 4.

The heating, which in this example is carried out on only one of the elements 1/3a, 3b—i.e. the series of elements 1—, is obtained by heating means 11a, 11b, which may be electric resistances, or for example steam jets.

Each heating means 11a, 11b is arranged to act on the end, or end face 1a or 1b of each element 1 belonging to the aforementioned interface or assembly area, 9a, 9b, until molten binder is present at that location(s) of at least one of the two green blanks 1, 3a and/or 1, 3b; see FIG. 3.

In this example of FIG. 3, it is therefore one and/or the other of the ends 1a and 1b which then have molten binder 13. The way in which this molten binder 13 can be present is explained in more detail below.

In any case, once this is done, it will be possible to:

e) assemble the two green blanks 1, 3a and/or 1, 3b, by means of the at least one assembly area 9a, 9b, so as to obtain the overall green blank of the part, 5; see FIG. 4, then f) remove at least part of the binder (which may be thermoplastic) from the overall green blank of the part, 5, so as to obtain a debonded overall green blank (in other words, a brown blank according to the terminology frequently used), and g) carry out at least one sintering treatment on the debonded overall green blank.

Figure 5:
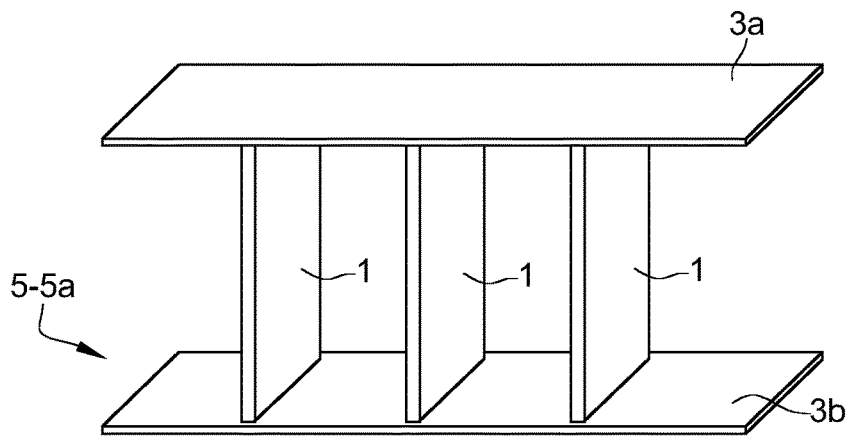
FIG. 5 represents a diagram of the elements of FIG. 4, in a subsequent state of making the part in accordance with the disclosure.

Once the tooling with supports 7 has been removed (see FIG. 5, after assembly and cooling/solidification of the molten binder), a final brown blank marked 5-5a in FIG. 5 will be obtained, which may undergo one or more final machining operations before being ready for use, as in the example in FIG. 6.

One or more intermediate machining operations may have taken place after assembly, but before debinding.

The debinding parameters (temperature, containment atmosphere, etc.) depend not only on the nature of the binder, but also on the nature of the powder, in this case metal. The main debinding techniques are: thermal degradation, dissolution in a solvent, or a combination of both.

On the debonded blank, the sintering treatment will enable it to be densified.

At least part of the heating of the interface area(s) where molten binder is present may be achieved by adding additional binder, as shown in FIG. 4 by the mark 13a between interface areas.

In this case, for crystallographic quality, it may be preferable:

before applying the additional quantity of binder, melt this additional quantity of binder 13a, then apply the additional amount of melted binder at the location of the assembly area 9b, and then carry out the assembling step of step e).

Note that such a pre-melting of binder 13a will preferably be carried out on binder mixed with feedstock.

In the example of FIG. 4, two series of areas 13 or two series of areas 13a could have been provided for, instead of one of each, although FIGS. 3 and 4 show that in area 13a, the end 1b of the elements 1 has been heated (like 1a) until this area of each element 1 has been rendered pasty (FIG. 3), and at the same time the additional quantity of binder 13a has been applied to the two elements 1, 3b, at their interface, i.e. in the assembly area (FIG. 4).

Thus, in this case, the application of the additional amount of molten binder 13a at the location of the inter-element assembly area has been ensured on both green (blank) elements, 1,3b.

With one or more edges melted in this way, the assembling step of step e) can be carried out safely and definitively:

by applying the two green blanks against each other at the location of the assembly area 13 and/or 13a, and then, by pressing the two green blanks towards each other, as shown by the arrows 15 in FIG. 4.

It should be noted that, in step d), at least the assembly area 9a and/or 9b of at least one of the two green blanks to be assembled together has been, in the example:
heated until molten binder between 75° C. and 85° C. at +/−5° C. was present, and
this heating has lasted between 2s and 15s.

An extra thickness L (FIG. 3) of between 0.5 mm and 2 mm (preferably up to 1 mm for the rectifier sector or nozzle sector application) at the interface may have been necessary so that during assembly, with the pressure applied (which may be between 5 MPa and 30 MPa and of the order of 10 MPa to within 20% for the aforementioned application), the dimensionality of the final part 5-5a is respected and the part is not crushed.

Thus, the precision of the assembly is important and has an impact on the final dimensions. This is one reason why the tooling with supports 7, which is present during press-fit assembly (step e; FIG. 4), is provided.

During assembly, it must be ensured in any case that sufficient pressure is applied so that the interface area 9 and/or 9a is not an interface of plastic binder only, but that this binder is mixed with the metal powder at this point.

With regard to the aforementioned extra thickness L of material which may be present at the location of the assembly area of at least one of the two green blanks, it is intended that it should disappear at least in part at the end of step e), in particular as a result of the assembly pressure exerted.

In practice, if it exists, this extra thickness L of material will extend in the direction where the assembly pressure is exerted; direction P FIG. 4.

In particular, it may consist of an extra length or extra thickness, possibly just local, of at least one of the elements 1, 3a or 3b in question.

The MIM molding presented above could have been made with ceramic, instead of metal powder. For such a CIM molding, the powder used could, as a non-limiting example, be one of a silico-aluminous compound, alumina (Al2O3), Zirconia (ZrO2), silicon nitride, silicon carbide, alone or in mixture.

The invention claimed is:

1. A method for manufacturing an aircraft or turbomachine part for an aircraft, by injection molding of at least a first green element and a second green element of the said part, comprising:
    a) preparing a mixture of a powder and a polymeric binder, which is liquid or molten, for each of the first and second elements, adapted to enable the powder grains to be bonded together,
    b) injecting the prepared mixtures into molds adapted to the shape of the first and second elements, respectively, to obtain two green blanks of the first and second elements, respectively,
    c) removing the two green blanks from the respective molds once the binder has become consistent,
    d) heating an additional amount of binder, then heating at least one assembly area of at least one of the two green blanks by applying the additional amount of binder at the location of the said assembly area, the at least one assembly area being located at the interface between the said two green blanks to be assembled together, so that molten binder is present at the location of the said assembly area, the said assembly area of at least one of the green blanks to be assembled together is heated by supplying an additional quantity of binder at the location of the said assembly area, and then
    e) assembling the two green blanks together through the said at least one assembly area to obtain an overall green blank of the said part, then
    f) removing at least part of the binder from the overall green blank to obtain a debonded overall green blank, and
    g) carrying out a sintering treatment on the debonded overall green blank, wherein the said part to be manufactured is a turbomachine compressor rectifier sector or a turbomachine turbine nozzle sector, and the said two green blanks, respectively, of the first element and the second element, are green blanks, respectively:
        of at least one part of the rectifying vane of the said rectifier sector or nozzle sector, and
        of a sector of an outer ring or a sector of an inner ring of the said rectifier sector or nozzle sector, with which one end of the said at least one part of the rectifying vane is to be assembled in step e).

2. The method according to claim 1, wherein applying the said additional amount of molten binder to the said assembly area comprises applying the said additional amount of molten binder to the said assembly area, on the two green blanks.

3. The method according to claim 1 wherein, during step d),
    the said at least one assembly area of at least one of the two green blanks to be assembled together is heated by supplying heat energy to at least one of the two green blanks, at the location of the said assembly area, until the said molten binder is present therein.

4. The method according to claim 1, wherein the assembling step of step e) is carried out by:
    applying the two green blanks against each other at the location of the said assembly area, and then,
    pressing the two green blanks towards each other.

5. The method according to claim 1, wherein
    during step d), at least the said assembly area of at least one of the two green blanks to be assembled together is heated until molten binder between 75° C. and 85° C. at +/−5° C. is present.

6. The method according to claim 5, wherein the said at least one assembly area of at least one of the two green blanks to be assembled together is heated between 2s and 15s.

7. The method according to claim 1, wherein at the location of the said assembly area of at least one of the two green blanks, the said or each green blank has an extra thickness (L) of material which disappears at least in part at the location of the said interface, at the end of step e).

8. The method according to claim 1, wherein the assembling step of step e) is carried out by:
    applying the two green blanks against each other at the location of the said assembly area, and then,
    pressing the two green blanks towards each other, and
    wherein at the location of the said assembly area of at least one of the two green blanks, the said or each green blank has an extra thickness (L) of material which disappears at least in part at the location of the said interface, at the end of step e), and the extra thickness (L) of material extends in the direction in which the assembly pressure is exerted.

9. The method according to claim 7, wherein the said extra thickness (L) of material is between 0.5 mm and 2 mm.

10. The method according to claim 1, wherein the mixture of powder and polymeric binder prepared in step a) comprises metal powder.

* * * * *